Sept. 8, 1931.       C. E. SUMMERS ET AL       1,822,860
CRANK SHAFT BALANCING MACHINE
Filed Aug. 6, 1926       8 Sheets-Sheet 1

Inventor
Caleb E. Summers
Thomas C. Van Degrift
By Blackmore Shumard Whit
Attorneys

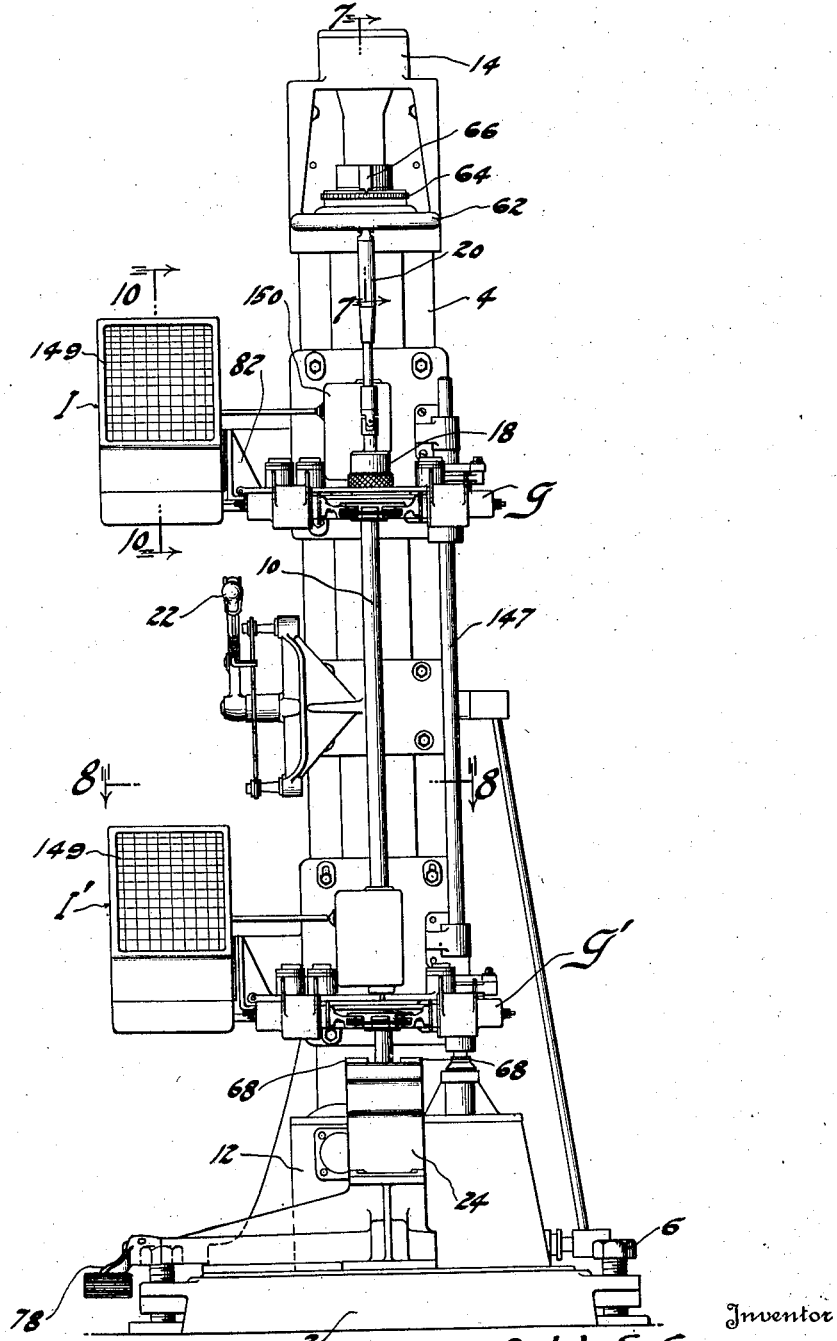

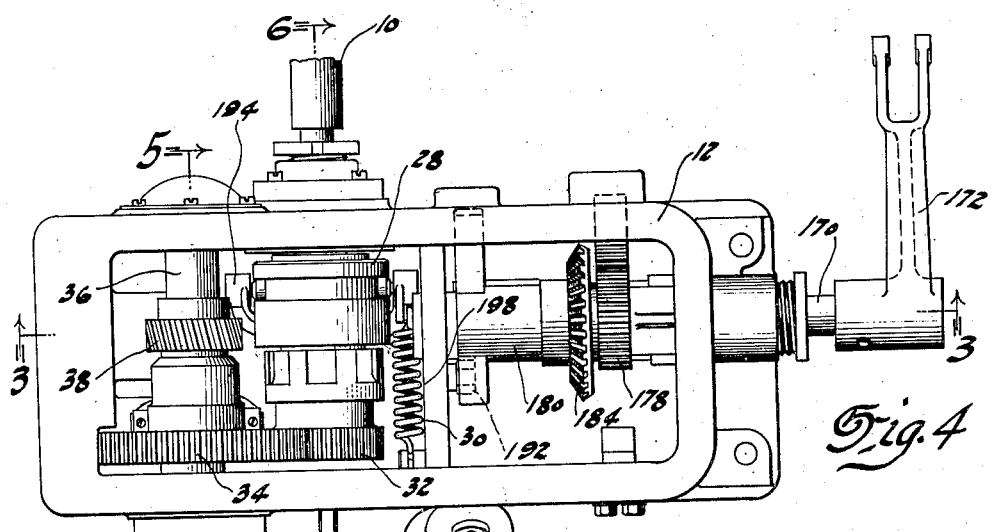
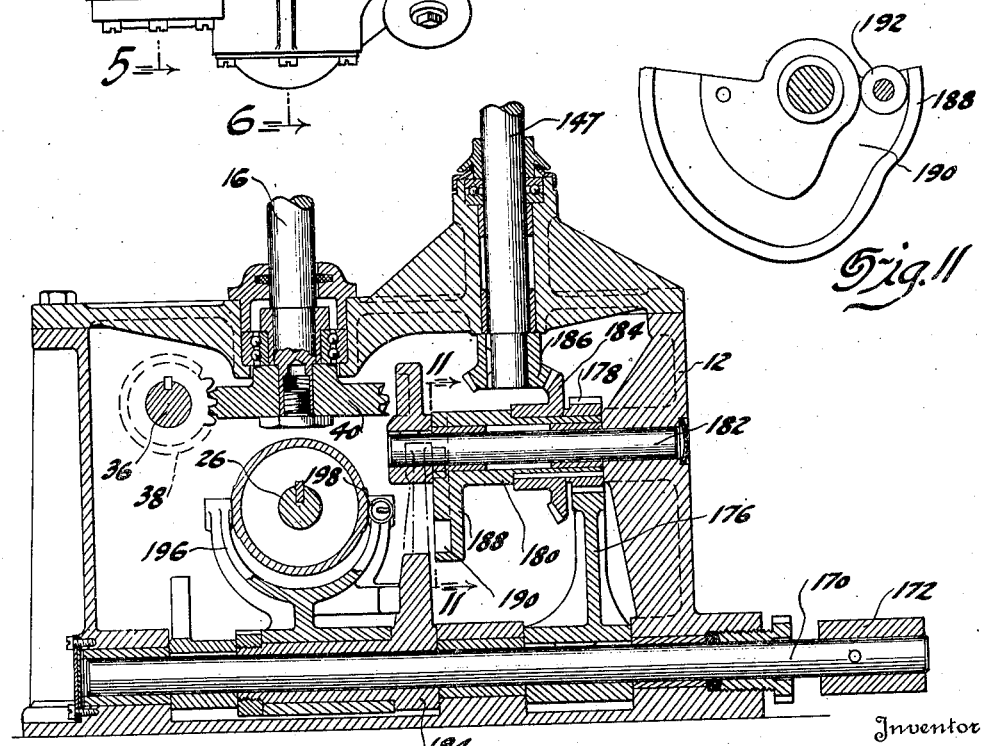

Inventor
Caleb E. Summers
Thomas C. Van Degrift
By Blackmore, Henere Whit
Attorneys

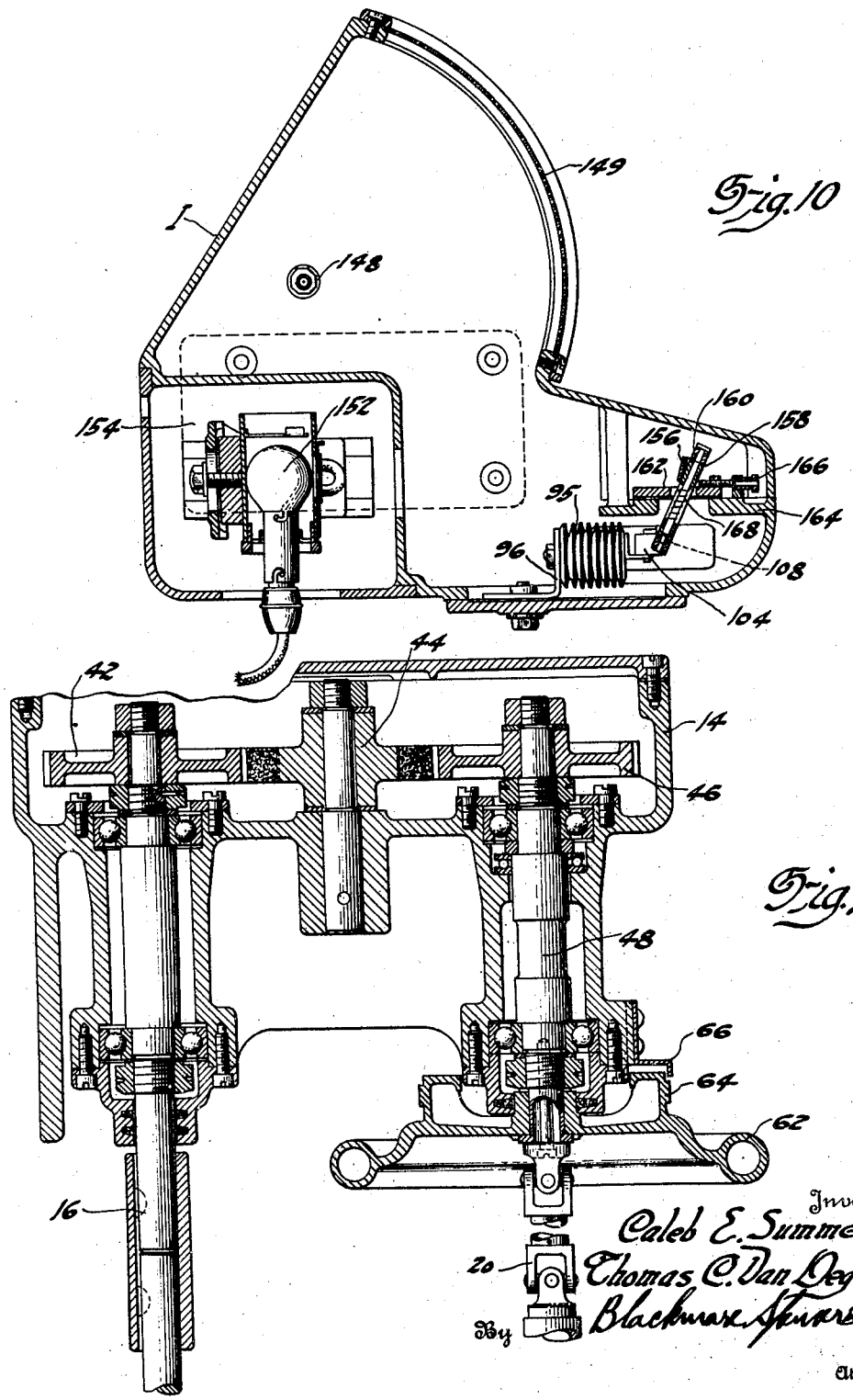

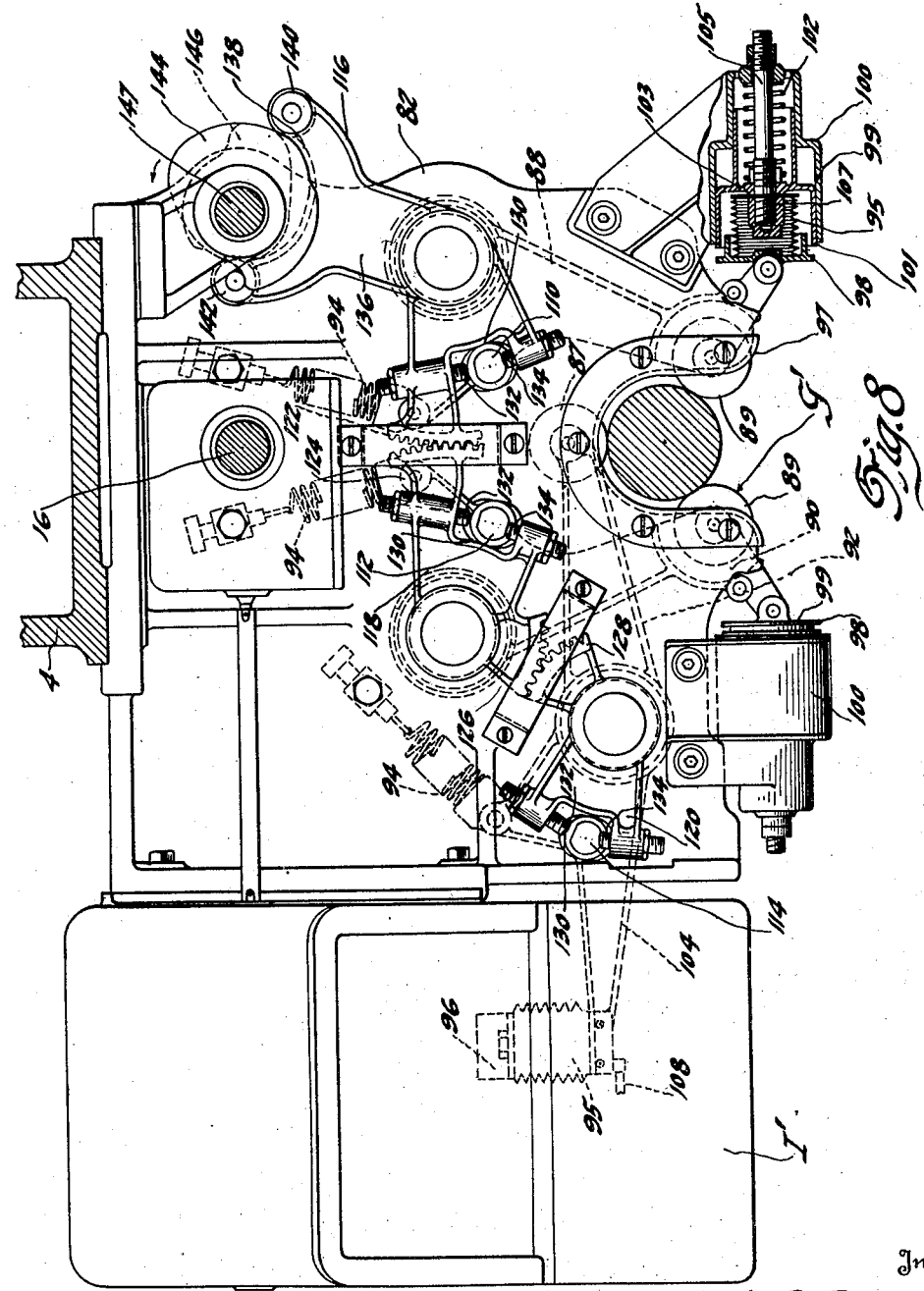

Sept. 8, 1931.   C. E. SUMMERS ET AL   1,822,860
CRANK SHAFT BALANCING MACHINE
Filed Aug. 6, 1926    8 Sheets-Sheet 7
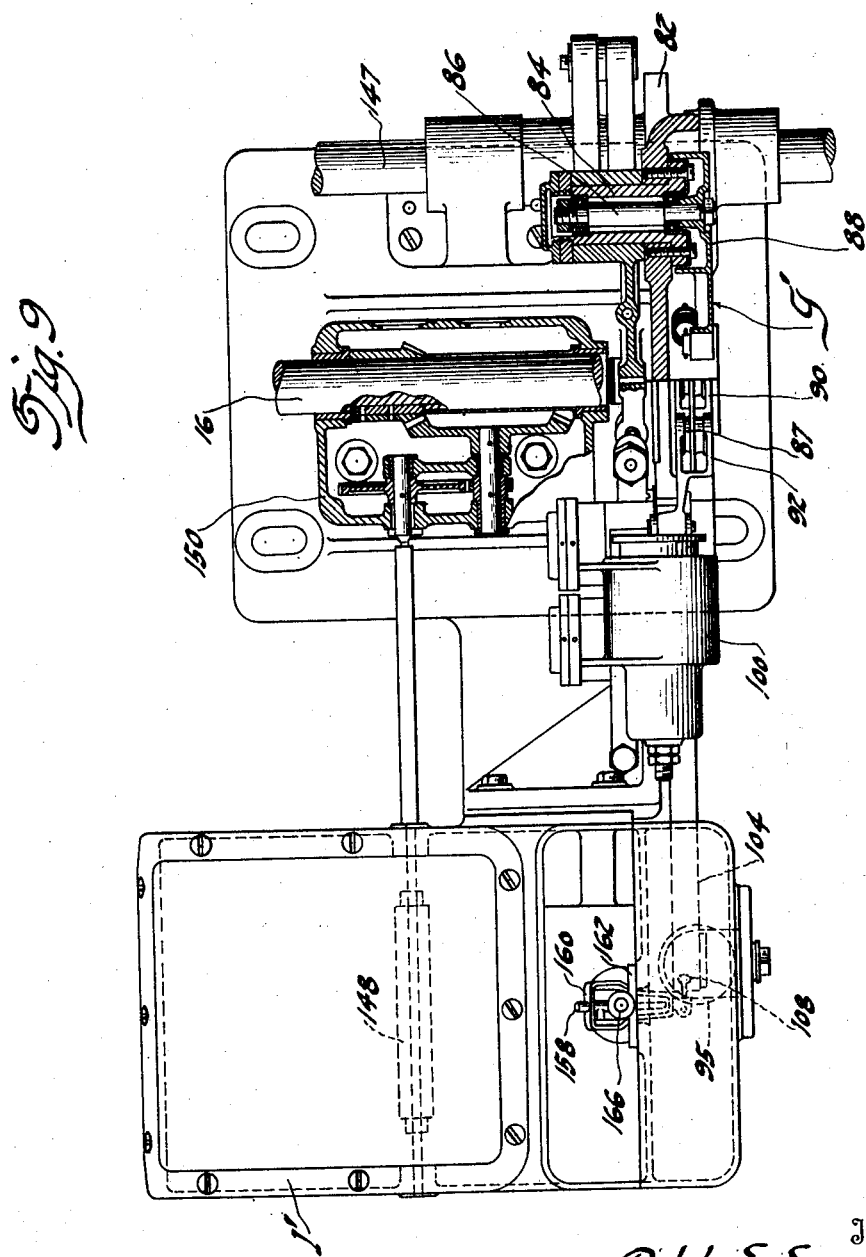

Sept. 8, 1931. C. E. SUMMERS ET AL 1,822,860
CRANK SHAFT BALANCING MACHINE
Filed Aug. 6, 1926 8 Sheets-Sheet 8
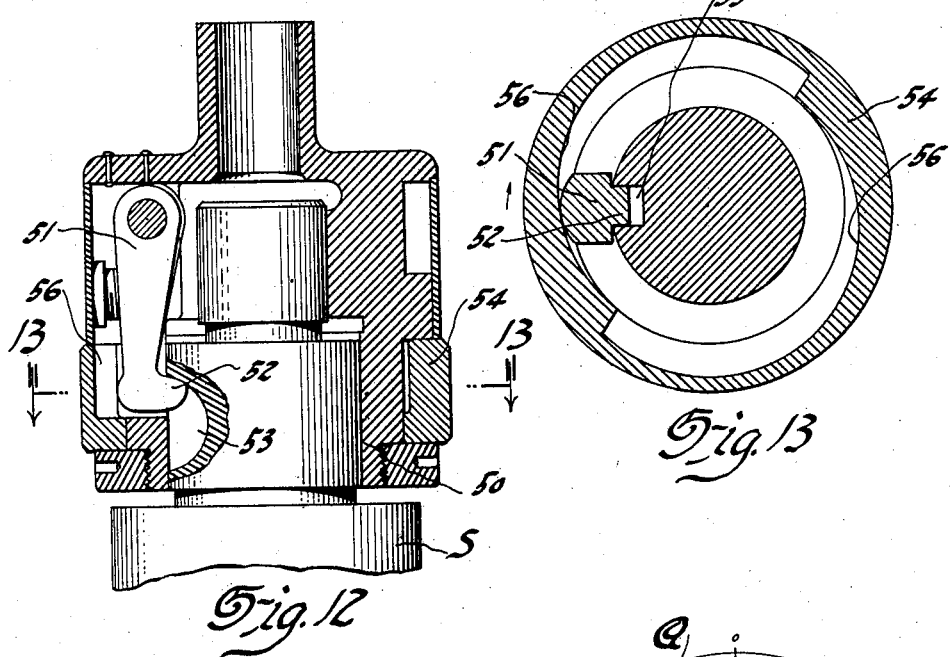
Fig. 12
Fig. 13
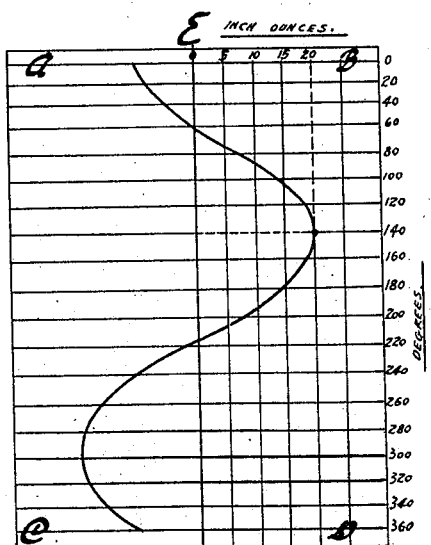
Fig. 14
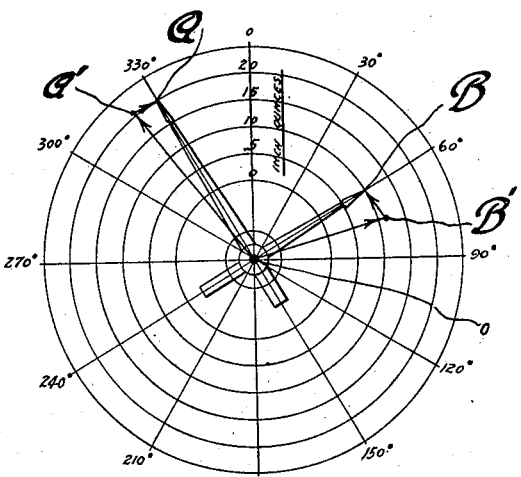
Fig. 15
Inventor
Caleb E. Summers
Thomas C. Van Degrift
By Blackmore Spencer & Whit
Attorneys Patented Sept. 8, 1931

1,822,860

UNITED STATES PATENT OFFICE

CALEB E. SUMMERS AND THOMAS C. VAN DEGRIFT, OF DETROIT, MICHIGAN, ASSIGNORS TO GENERAL MOTORS RESEARCH CORPORATION, OF DETROIT, MICHIGAN, A CORPORATION OF DELAWARE

CRANK SHAFT BALANCING MACHINE

Application filed August 6, 1926. Serial No. 127,712.

This invention relates to methods and machines for indicating unbalance in rotating bodies. As a true method it is capable of being carried out with various types of apparatus or machines. We have chosen for illustration a machine designed especially for the balancing of automobile crankshafts but it is obvious that the inventive idea may assume many other forms and that machines embodying the invention may be used for the balancing of any type of rotating body.

Balancing machines and methods heretofore used have been open to a number of serious objections particularly when employed in large scale production. Thus some of the earlier types have been designed to indicate static unbalance only, neglecting the important factor of dynamic unbalance all together. In other processes heretofore employed shafts have been tested for static unbalance and then corrected, and then tested for dynamic unbalance and corrected; this involving two operations of either removing material from portions of the shaft or adding material to portions of the shaft and it may be shown that in some instances this may require the removal or addition of several times as much material as need be for proper balancing. Since bodies which are in dynamic balance are necessarily in static balance special tests for static balance are unnecessary.

A defect common to a number of machines now in use for indicating dynamic unbalance is that both the angle and amount of unbalance are not determined. Thus in one type of apparatus the amount of unbalance is measured but the angle of unbalance can only be found by the "cut and try" method of applying a weight of the proper size at different places until balance is achieved. Other types give the angle only, the amount of unbalance being ascertained by experiment.

Probably the most serious objection to many of the machines now on the market is that they are too slow, requiring too many men and too much space to be practical for big production. Where the test does not ascertain both the location and amount of unbalance a great deal of time is consumed by the operator in experimenting with different weights or with different angles. In addition, many machines involve the principle of mounting the shaft in an oscillating frame, rotating the shaft until it reaches a speed above the critical speed of the system, disconnecting the drive and allowing the shaft to coast through the critical speed at which a reading of the amount of oscillation is taken. This operation requires considerable time and usually must be repeated either with the shaft driven in the opposite direction or reversed in the machine for the angle or amount of unbalance lies between the two ascertained values.

Machines of the last named type likewise illustrate a defect common to a large group in that the movement of the shaft as a result of unbalance is not directly measured. This results in the interposition of a more or less cumbersome system of oscillating or sliding frames, springs, rollers, and the like, between the body and the indicating means each of which affords a source of error in addition to complicating the machine and causing it to occupy an inordinate amount of floor space.

The object of our efforts has been to devise a method and machine for directly indicating the amount and position of unbalance in the shortest possible time yet with a high degree of accuracy.

According to our invention the shaft is rotated while mounted so that it is substantially free to assume a position of rotating balance. If the shaft is in balance it will perform a true rotation about its geometrical axis; if it is out of balance the unbalance will cause portions of the shaft to perform a motion of revolution as well as rotation so that in effect these portions of the shaft revolve as eccentrics. The angle and amount of this eccentricity is a measure of the position and amount of unbalance. As to the angle it will be understood that the heavy side of the shaft will be opposite the high side of the 'eccentric' for the heavy side must be drawn in toward the center and the light side pushed out from the center of revolution to achieve a rotating balance.

Obviously this method may be employed with the shaft mounted at any angle. However, if the shaft occupies any other position than a vertical one it is difficult to support it so that the resistance to eccentric motion will be the same in all directions. While this can be done it necessitates the employment of a complicated supporting system of springs or other cushioning devices. To avoid this we have preferred to support the shaft in vertical position. This may best be done by suspending the shaft by means of flexible shafting which for convenience, likewise serves to drive it.

While the direction and amount of eccentricity may be measured at various points along the shaft we have preferred for convenience and accuracy to take measurements at points adjacent the ends of the shaft, such as the usual end journals. These measurements would afford a fairly accurate indication of the amount and angular position of unbalance were it not that the unbalance in one end produces an apparent lack of balance in the other. That is, if the shaft actually needed correction at one end only, both ends would appear to be out of balance.

To eliminate this effect we have found it best to hold one end of the shaft for rotation about its geometrical axis while taking measurements of the displacement of the other end. The operation is then repeated with the last named end held and the first named end free. We thus obtain data as to the location and amount of the forces of unbalance acting on the free ends of the shaft in the planes of measurement, but it is not practicable to weaken the journals by removing material from the shaft in these planes, and, obviously, if the indicated amount of material is removed from the shaft at the ascertained angular position but in another plane the out of balance will not be corrected for the effect of an unbalanced mass varies with the lever arm at which it operates. This may also be stated as follows; the reading taken at one end of the shaft is a measurement of the resultant of all the forces of unbalance scattered along the length of the shaft between the point held and the point measured. To eliminate from this reading the effect of the resultant unbalance at the opposite end of the shaft it is necessary to subtract from the indicated reading the vector quantity which represents the effect of such unbalance. This vector quantity will have a direction parallel to the direction of out of balance at the opposite end of the shaft and an amount substantially proportional to the ratio of its lever arm to the lever arm at which the reading was taken. The corrected readings are accurate indications of the location and amount of metal to be removed at each end of the shaft.

In the practical operation of the balancing machine some departures from theoretical conditions are necessary, of which the following may be mentioned:

1. In suspending the shaft, the finite length of the flexible shafting by which it is suspended causes an angular position of the suspending shaft when there is a displacement of the upper end of the shaft being tested. This angular position imposes a centripetal force which slightly alters the movement of the shaft.

2. If the crankshaft is suspended (freely) without any restraint, the accidental forces due to universal joint friction, windage, etc., will tend to set up pendulum swings in the shaft which interfere with proper observation of the unbalance. To eliminate this, damping means are applied which restrain the shaft slightly so that the extraneous oscillations are eliminated. However, the damping means also modifies the eccentric motion although to a very slight extent.

3. The addition of any mass attached to but not rotating with the crankshaft such as the damping means, has a tendency to alter the phase relation between the unbalance and its manifestation.

To eliminate these possible errors and others which may be inherent in each individual balancing machine, each machine is calibrated with the particular shaft which it is designed to balance. Known degrees of unbalance are applied to a shaft, otherwise in balance, and the effect noted on the indicating mechanism. Thus the graduations on the indicators are made to conform to the actual unbalance which produces this reading on the indicator.

The machine which we have devised for carrying out the above process involves a number of novel features many of which may be employed on machines of other types, particularly those in which the movement of the free end of the shaft is limited to a single plane. Thus our machine involves devices for alternately holding the opposite ends of the shaft for concentric rotation, these devices being so arranged that they may be brought into play during the rotation of the machine so that but one test run is necessary. We have also preferably provided a simple type of control means whereby by the manipulation of a single lever or equivalent part the holding devices may be brought into play in proper sequence. The holding mechanism preferably includes devices which when released from holding engagement serve to damp the movement of the ends of the shaft as previously described. For simplicity, one of the damping devices is employed for the actuation of the indicating mechanism. The indicating mechanism is thus operated by a member in direct contact with the shaft eliminating errors which arise from the employment of intermediate devices such as swinging frames and the like between shaft and indicator arm. Obviously various ones of the above described features may be employed with other types of balancing machines.

Our machine also embodies a special type of optical indicating mechanism such that the eccentric motion of the shaft is amplified and spread upon a screen or equivalent member in the form of a curve so that its characteristics may be conveniently studied. The indicating mechanism is preferably synchronized with the rotating shaft so that the angular position of unbalance may be determined from the curve.

Our machine is likewise characterized by simplicity of control. The lever which, as we have previously indicated, controls the operation of the holding means, preferably also acts to control the engagement of the driving clutch, and, if desired, the application of a brake to bring the shaft quickly to a stop upon completion of the tests.

For the convenience of the operator we have likewise provided a device for elevating the shaft into position for suspension. For various other features of novelty reference should be had to the following specification and claims.

In the drawings:

Figure 1 is a side elevation and Figure 2 is a front elevation of the balancing machine.

Figure 3 is a sectional view on line 3—3 of Figure 4.

Figure 4 is a top plan view of the gear box shown in Figure 3 with the cover plate and the gears and shafts carried thereby removed.

Figure 5:
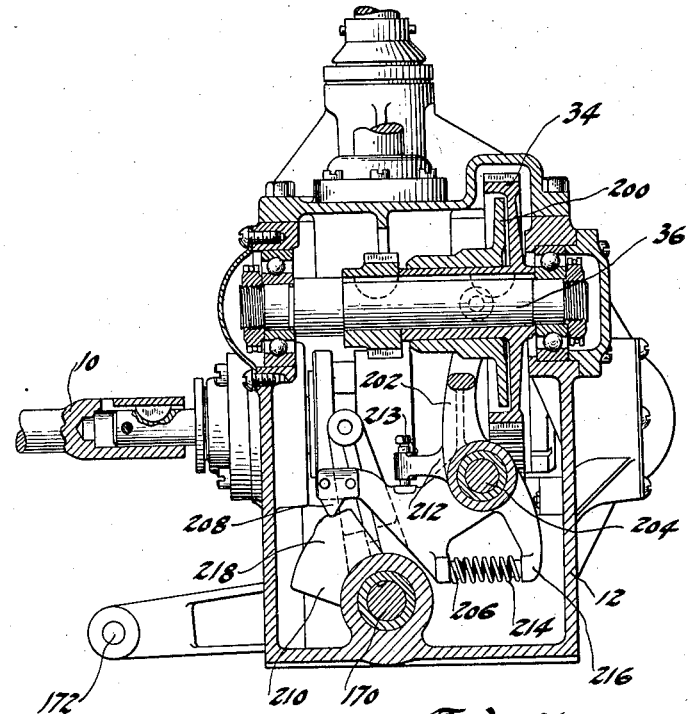
Figure 6:
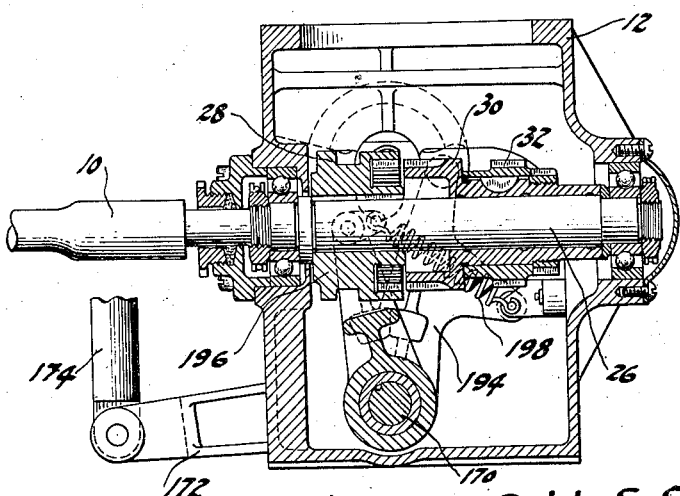

Figures 5 and 6 are sections on lines 5—5 and 6—6, respectively of Figure 4, but with the cover plate in position.

Figure 7 is a section on line 7—7 of Figure 2 showing the overhead gearing for rotating the crankshaft.

Figure 8 is a view showing the guiding devices for the shaft and is taken on line 8—8 of Figure 2. In this view one of the damping devices is shown in section.

Figure 9 is a front elevation of the mechanism shown in Figure 8 but with parts sectioned to better illustrate the construction.

Figure 10 is a section through the indicating mechanism taken substantially on line 10—10 of Figure 2.

Figure 11 is a detail taken on line 11—11 of Figure 3.

Figure 12 is a vertical sectional view through the coupling device for gripping the end of the crankshaft.

Figure 13 is a section on line 13—13 of Figure 12.

Figure 14 shows a calibrated screen of the type used with our indicating mechanism with a typical curve illustrated thereon.

Figure 15 is a diagram illustrating the vector correction which is applied to the readings.

The machine illustrated in the drawings consists essentially of mechanism for rotating the shaft, guiding mechanism for holding the ends of the shaft, permitting substantially free movement thereof, or entirely clearing both ends thereof, indicating mechanism adapted to show the angle and degree of eccentricity of the movement performed by each end of the shaft when free, and control devices for causing the mechanisms to operate in proper sequence.

Figure 1:
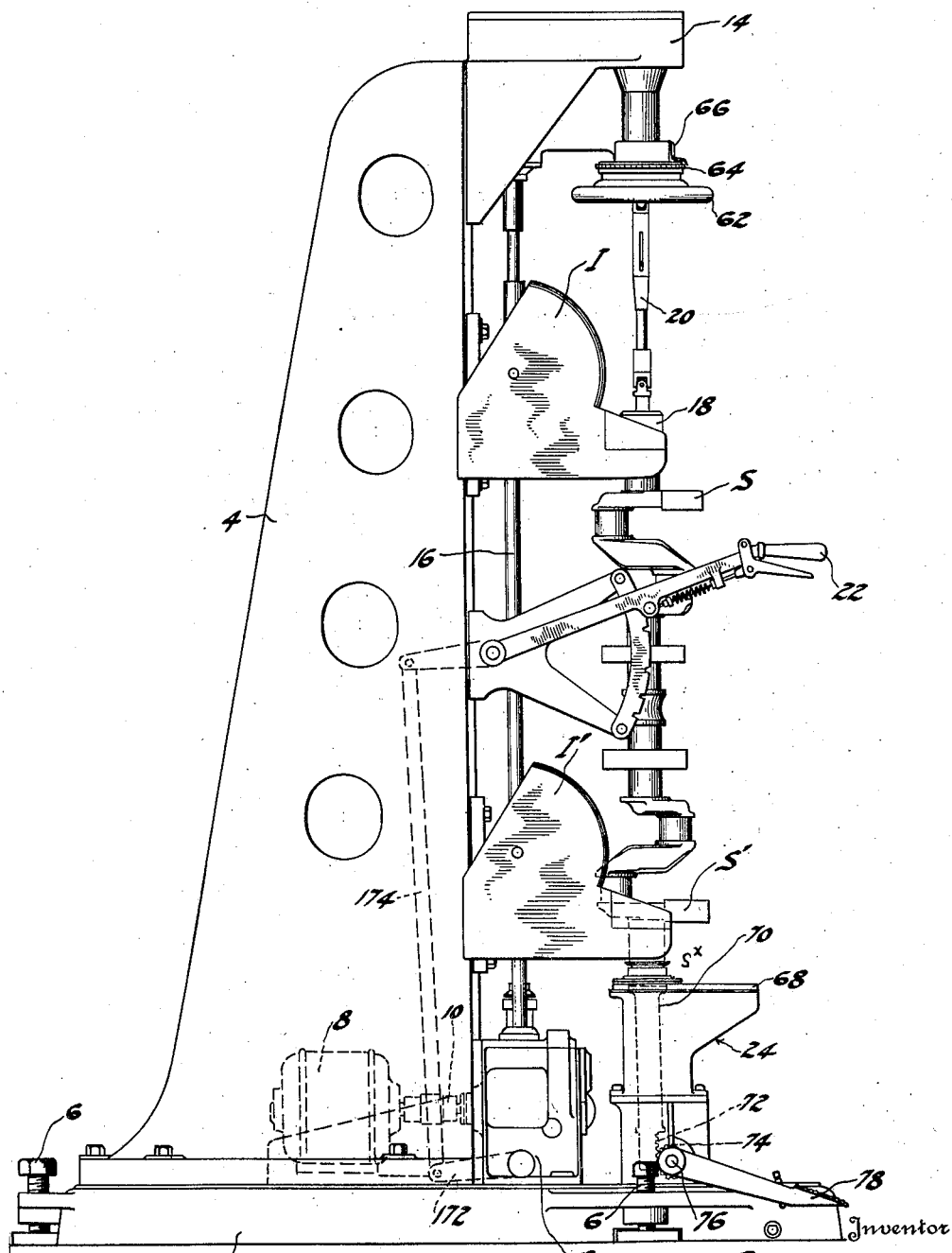

The general layout of the machine is clearly shown in Figures 1 and 2. The supporting framework is constituted by base 2 and pillar 4 rising from the base. The base is preferably provided with suitable levelling devices in the form of adjusting screws 6. Upon the base is mounted motor 8 which rotates the crankshaft S, Figure 1, through gearing contained in gear boxes 12 and 14 mounted respectively at the bottom and top of the pillar and connected by shaft 16, the crankshaft being directly engaged and supported by coupling 18, carried by universally jointed shaft 20 driven by the last named gearing. Adjacent the top of the crankshaft the pillar supports guiding mechanism G and indicating mechanism I, and adjacent the bottom of the shaft similar guiding mechanism G' and indicating mechanism I'. Gear box 12 likewise houses mechanism for controlling the rotation of the shaft and the operation of the guiding devices, this mechanism being connected to hand lever 22 supported at a convenient height upon the pillar. For the convenience of the operator there is likewise mounted on the base directly below the coupling 18 a lifting jack 24 to assist in raising the crankshaft into position for engagement with the coupling.

The mechanism for driving the shaft will now be described in detail. As shown in Figures 1 and 6 the shaft 10 of motor 8 is connected to shaft 26 journaled in gear box 12 and having keyed to it slidable clutch member 28 adapted for engagement with clutch member 30 loosely mounted on the shaft. While I have illustrated a clutch of the positive type it is obvious that any preferred form of clutch may be used and for some purposes a friction type of clutch is to be preferred. To clutch member 30 is rigidly secured gear 32 meshing with gear 34 on countershaft 36 as clearly shown in Figure 4. Upon this countershaft is likewise keyed gear 38 which meshes with gear 40 carried upon vertical shaft 16 as shown in Figure 3. Referring now to Figure 7, the upper end of shaft 16 projects into gear box 14 where it is provided with gear 42 meshing with idler 44 which in turn meshes with gear 46 mounted upon a short stub shaft 48 to the lower end of which is secured universally jointed shaft 20 carrying at its lower end the coupling 18 as previously described. Idler 44 is preferably constructed in part of fiber, or equivalent material, to eliminate shock and vibration.

With the mechanism above described it is apparent that when the motor is rotated and clutch members 28 and 30 are engaged, motion will be transmitted from shaft 26 to countershaft 36 through intermeshing gears 32 and 34; from the countershaft to vertical shaft 16 through intermeshing gears 38 and 40; from the vertical shaft to stub shaft 48 through gear train 42, 44, and 46; and stub shaft 48 will drive the crankshaft S through jointed shafting 20 and coupling 18. It is to be understood that the drive mechanism is capable of considerable modification and while the form illustrated has been found to be suitable for the particular design of machine herein illustrated various other forms of drive may be employed as convenience may dictate.

To suspend the crankshaft and at the same time insure that it will occupy a fixed angular relation to the drive mechanism we prefer to employ a special type of coupling, such as disclosed in Figures 12 and 13. This coupling comprises a socket 50 adapted to receive one end of the shaft, and a pivoted dog 51 having a nose 52 adapted to be forced into engagement with key-way 53 in the shaft by rotation of collar 54 which is provided with internal wedging surfaces 56 for engagement with the end of the dog.

To permit indexing of the crankshaft to any desired angular position there is secured to the lower end of the stub shaft 48 a hand wheel 62 carrying a dial 64 marked off in degrees. With the dial cooperates a stationary pointer 66. The hand wheel likewise affords a convenient means for bringing the shaft to a stop.

For the convenience of the operator in mounting shafts in the machine and removing them therefrom we have provided the jack indicated at 24. At the top of the jack are arranged spaced guide-ways 68 adapted to engage flange $S^x$, customarily provided at one end of the crankshaft, to support the shaft while being slid into place above the lifting plunger 70. This plunger carries rack teeth 72 at its lower end for engagement by pinion 74 secured to rock shaft 76 operated by foot pedal 78. In placing a crankshaft in the machine the operator rests the flanged end of the shaft on the guide-ways and slides it into place above the lifting plunger 70 whereupon he depresses the foot pedal 78 raising the shaft to a convenient height for connection with the coupling 18 and causing its lower end to clear the guideways. When the coupling is connected to the upper end of the shaft, the foot pedal is released and the shaft remains suspended. Obviously, the jack may be omitted if desired but it has been found to be of great convenience in handling heavy shafts.

As previously stated our invention involves the idea of spinning the suspended shaft while either one or both of its ends are substantially free and observing the character of the motion performed by such free end or ends. To prevent long pendulum swings we have found it desirable to employ guiding devices for the free ends of the shaft. While any sort of simple appliance may be used for this purpose we have preferred to employ devices of the type shown in Figures 8 and 9. These devices function not only to guide the free end or ends of the shaft but also to hold either end of the shaft for rotation about its geometrical axis when desired. It is obvious, however, that, if preferred, the two functions may be performed by separate mechanisms. We have likewise preferred for simplicity to make use of a part of the guiding mechanism for the actuation of the indicating mechanism but it is likewise obvious that if desired a separate indicator actuating member may be employed.

The guiding mechanisms indicated at G and G' are identical in construction except that their respective controlling cams are out of phase so that when one end of the shaft is held the other end is free. A detailed description of one of the guiding devices will suffice for both.

Referring now to Figures 8 and 9, to the pillar 4 is secured a supporting member 82 of irregular shape carrying hollow trunnions 84, one of which is shown in section at the right of Figure 9. Within each trunion is journaled a pivot pin 86 to the lower end of which is secured a lever carrying a roller 87 at its outer end for engagement with the shaft. These levers are indicated on the drawing by reference characters 88, 90, and 92. It will be noted that the rollers 87 are narrow so that their contact with the shaft approximates point contact. Consequently they do not interfere appreciably with wobble of the free portions of the shaft when locked in engagement with it. To the end of another arm of each of the levers is secured a spring 94 for yieldingly forcing its respective roller into engagement with the shaft. To prevent building up of swinging vibration of the levers we have provided each of them with a suitable damping means, preferably of a type which is substantially aperiodic.

While the damping means may be located at various places we have found it convenient to provide one at the roller carrying end of each of the levers 88 and 90 and a third at the end of arm 104 of lever 92. The damping devices, one of which is shown in detail at the right of Figure 8, comprise bellows 95 interposed between the ends of the respective levers and a suitable support. In the case of arm 104 one end of the bellows is secured directly to the end of the arm while the other end is secured to a fixed bracket 96. In the case of arms 88 and 90 one end of the bellows is secured to a plate 97 pivoted to the end of the respective arm and provided with an outwardly projecting flange 98 for a purpose to be later described, while the other end is secured to a piston 99 slidably mounted in barrel 100, the piston having a flange 101 and being urged outwardly of the barrel by means of spring 102. This spring is so stiff that the small oscillations of the levers incident to testing of shafts have no effect upon it. A guide bolt 105 is secured to each of the pistons and projects within the bellows where a filler block 107 is secured to it. Each of the bellows is provided with a small aperture 103. In the normal operation of the machine eccentric motion of the crankshaft under test causes the levers to oscillate, alternately expanding and contracting the bellows and causing a restricted flow of air in and out through apertures 103. The air cushion effectively damps out any vibration of the levers. Obviously some other fluid may be substituted for air if desired. The filler block 107 and the end of guide bolt 105 serve to reduce the air capacity of the bellows so that there is not too great a flow of air in and out through aperture 103. The purpose of the yielding mounting for the outer ends of the bellows associated with arms 88 and 90 is to relieve the bellows from excessive pressures when the roller carrying arms are positively withdrawn from engagement with the shaft by mechanism under control of the operator which will be later described. In such case after initial compression of the bellows flange 98 on plate 97 engages flange 101 on barrel 100 forcing the piston outwardly thus relieving the bellows from excessive compression. If desired the bellows secured to the end of arm 92 may be mounted in a similar manner.

The movement of any one of the levers 88, 90 or 92 may be employed to operate means for indicating the character of motion performed by the end of the shaft. We have chosen to use the lever 92 for this purpose, the end of the arm 104 of the lever as illustrated in Figures 8 and 10, contacting with arm 108 connected with the indicating mechanism.

We shall now describe the means for holding the guide members either in position to clear the shaft and permit its free insertion or removal or in position to restrict the end of the shaft to rotation about its geometrical axis. The levers 88, 90 and 92 are provided with studs 110, 112 and 114, respectively, projecting upwardly through elongated guide slots formed in the supporting member 82. Journaled upon the upwardly projecting portion of each of the hollow trunnions 84, as illustrated at the right of Figure 9, is a rocker member. These members numbered 116, 118 and 120 cooperate with the respective devices 88, 90 and 92 mounted on the same axis, and are connected for simultaneous movement by means of intermeshing teeth 122 and 124 on members 116 and 118, and intermeshing teeth 126 and 128 on members 118 and 120. Each of the rocker members is provided with a bifurcated portion 130 straddling the upwardly projecting stud carried by the underlying lever. In the bifurcated portion of each of the levers are secured adjustment stops 132 and 134 for cooperation with its respective stud. Rocker member 116 is provided with arm 136 having a bifurcated end 138 provided with rollers 140 and 142 engaging cams 144 and 146, respectively, mounted on vertical control shaft 147. These cams are preferably of such design that the rollers at all times engage their surfaces and consequently the rocker members are at all times under positive control.

The cams are designed to cause the following sequence of operations: In the starting position of the operating lever 22 stops 132 engage studs 110, 112 and 114 and hold the rollers out of engagement with the shaft. In this position a shaft may be readily inserted or removed. The initial movement of the control lever swings rockers 116, 118 and 120 withdrawing the stops 132 from engagement with the studs and causing stops 134 to engage the studs so that the rollers at both ends of the shaft are locked in engagement with it. This position of the stops is shown in Figure 8. Next the clutch 28—30 is engaged and the shaft is rotated. The stops 134 at the upper end of the shaft are now withdrawn from engagement with the corresponding studs so that the upper rollers now but yieldingly restrain the shaft. In the next position of the control lever the stops at the top of the shaft are moved into holding engagement with the studs so that this portion of the shaft is now permitted concentric rotation only, while the stops at the bottom of the shaft are released from engagement with the studs permitting the rollers to yield in response to eccentric movement of the shaft. In the final position of the control lever the stops at the upper end of the shaft are moved from engagement with the studs while the stops at the lower end remain unchanged so that the shaft is now yieldingly held at both ends. With the rollers yieldingly engaging the shaft if the shaft be unbalanced its ends will rotate as eccentrics and the levers will perform an oscillating movement which is transmitted by one of them to the indicator operating arm 108.

Any desired type of indicating mechanism may be employed. In some instances we have preferred to connect the indicator operating arm 108 through suitable motion multiplying devices with a pencil which makes a record upon an indicator card. However, in our preferred form we employ the optical type of indicator now to be described.

Referring particularly to Figures 9 and 10, within the housing of the indicating mechanism is rotatably mounted on octagonal mirror 148 arranged to reflect light upon screen 149. The mirror is driven from shaft 16 by means of gearing contained within housing 150 and shown in detail in Figure 9. An electric lamp 152 concealed in a pocket 154 formed in the indicator housing projects a ray of light upon a mirror 156 secured to an inclined rock shaft 158 journaled in frame 160 carried by slide 162 mounted on supporting bracket 164 formed in the indicator housing. The mirror may be adjusted by manipulating set screw 166 which determines the position of the slide. To the lower end of the rock shaft is secured the arm 108, which as previously described, bears against the end 104 of lever 92 as shown in Figure 8. A torsion spring 168 surrounding the rock shaft yieldingly urges the arm into engagement with the lever. By the described construction it is apparent that oscillations of lever 92 are transmitted to the mirror causing the ray of light from the lamp to be shifted back and forth along the axis of the revolving mirror 148 with an amplitude of movement many times that of the lever. The mirror reflects the light upon screen 149 in the form of a straight line if the shaft be in balance or in wave form as shown in Figure 14 if it be out of balance. The screen may take the form of a photo-sensitive surface if a permanent record is desired. The gearing for driving the crankshaft and the mirror is of such ratio that while the crankshaft makes one complete revolution the light ray traverses the distance between line A—B and C—D, on the screen as shown in Figure 14, so that each position of the ray corresponds to a determined angular position of the shaft. In the initial adjustment of the indicating apparatus hand wheel 62 is rotated until pointer 66 is at the zero mark on the dial 64 which may correspond, for example, to the angular location of number 1 throw on the crankshaft. Set screw 166 is then adjusted until the spot of light projected by oscillating mirror 156 upon rotating mirror 148 and thence upon screen 149 falls at line A—B on the screen. With the parts so adjusted rotation of mirror 148 causes the reflected ray to trace a line on the screen and if there is unbalance in the shaft the resultant oscillation of mirror 156 causes the line to be periodically distorted to one side and then the other producing a trace of wave form upon the screen. The amplitude of this wave varies approximately as the amount of unbalance and the position of the peak of the wave determines its approximate location. However, for accurate results it is necessary to apply corrections hereinafter explained.

We have now described the mechanism for rotating the shaft, the guiding mechanism, and the indicating mechanism. We shall next describe the control means whereby these devices are caused to operate in proper sequence. As previously stated, gear box 12 houses mechanism for controlling the rotation of the shaft and the operation of the guiding devices. The principal element of this controlling mechanism is rock shaft 170 which extends the full length of the gear box and is provided with arm 172 connected with hand lever 22 by means of link 174. Keyed to the rock shaft is gear sector 176 meshing with gear 178 secured to sleeve 180 loosely mounted on countershaft 182. To sleeve 180 is likewise secured bevel gear 184 meshing with bevel gear 186 secured to the lower end of vertical control shaft 147. It is now apparent that rocking of shaft 170 will through engagement of sector 176 with gear 178 cause rotation of sleeve 180 which in turn is transmitted to vertical shaft 147 through the intermeshing bevel gears 184 and 186. Shaft 147 carries the two sets of cams 144 and 146 for controlling the operation of the guide rollers as previously described.

Clutch 28—30 is controlled from rock shaft 170 in the following manner. Sleeve 180, previously described, is provided at one end with member 188 shown in detail in Figure 11, and having a cam slot 190 to receive roller 192 carried by rocker member 194 loosely mounted on the rock shaft. Also loosely journaled on the rock shaft is shifter fork 196 for sliding the movable clutch member 28. Rocker member 194 is connected with the shifter fork by means of coil spring 198.

It is now apparent that when sleeve 180 is rotated as previously described, roller 192 on rocker 194 travels in cam slot 190 and upon reaching the inclined portion of the slot is forced outwardly placing spring 198 under tension thereby rocking shifter fork 196 and engaging clutch members 28 and 30. The spring serves the purpose of yieldingly drawing the clutch members into engagement preventing racking of the mechanism which might otherwise result. As the initial portion of the cam slot is concentric the first part of the rotation of the sleeve 180 will have no effect upon the clutch operating mechanism. The purpose of this is to permit application of a brake to the drive mechanism upon return movement of the control lever as will be later described. It will be noted that the portion of the cam slot beyond the inclined portion is also concentric so that when once engaged the clutch remains engaged throughout the remaining operations of the machine. The period of engagement conforms to the period during which first one and then the other end of the shaft is held while the opposite end is measured for balance and finally, if desired, while both ends are substantially free.

The brake mechanism which is best illustrated in Figure 5 will next be described. The brake may be located in any desired position between the clutch mechanism and the shaft or may be omitted altogether, the hand wheel 62 being employed to restrain the rotation of the shaft. We have indicated at 200 a brake in the form of a disk slidably mounted on countershaft 36 and adapted for engaging a braking surface formed on the gear 34. This brake is operated by means of shifter fork 202 mounted upon countershaft 204 upon which is also loosely mounted rocker member 206 provided with nose 208 for engagement with cam 210 secured to rock shaft 170. Shifter fork 202 is provided with an arm 212 carrying a stop in the form of an adjustable set screw 213 at its outer end for engagement with member 206. A compression spring 214 is interposed between arm 216 on fork 202 and the rocker member 206 to hold it in engagement with the stop. Cam 210 is provided with hump 218 for engagement with nose 208 to effect rocking of members 206 and 202 and application of the brake. The position of the hump on the cam 210 is such that in the initial position of the parts the brake is disengaged. At this time the guide rollers are held in their outward positions to permit removal or insertion of a shaft. A slight movement of the rock shaft 170 causes hump 218 to apply the brake in the manner described. In the next movement of the rock shaft the hump passes out from under the nose 208 and the brake is released. The application and release of the brake takes place before the control lever reaches the first notch. It is during the remaining portion of the movement of the control mechanism that the shaft is rotated and tested. After the tests have been completed the control lever is returned to its original position and following disengagement of clutch members 28 and 30, hump 218 on cam 210 engages nose 208 on member 206 and applies the brake to stop the rotation of the shaft.

Each of the mechanical units comprising the complete machine has now been described in detail. The operation of the machine as a whole will now be stated.

It will be assumed that the indicator has been adjusted so that when the shaft is in a particular position, say with the center line of number 1 throw alined with the index finger 66, the ray of light is at the top of its stroke and lies on line A—B of the chart. It will also be assumed that the screens 149 of the indicating mechanisms I and I' have been calibrated as illustrated in Figure 14. Since the movement of the light ray from line A—B to line C—D corresponds to one complete revolution of the crankshaft the chart has been ruled off in parallel horizontal lines to indicate the angular position of the shaft corresponding to the position of the light ray. Since the roller carried by the indicator actuating arm 92 engages the side of the shaft diametrically opposite the index finger 66, if the screen 149 were calibrated to give the angle of contact of roller and shaft line A—B would be labelled 180°, for the roller contacts with the shaft at a point 180° beyond the reference line, which is the position of No. 1 throw. However, as previously explained, the heavy side of the shaft lies diametrically opposite the high side of the "eccentric" constituted by the end of an unbalanced shaft in its revolution. Consequently the angle the operator wants to know is the angle which lies 180° beyond the angle of contact. The screen is therefore calibrated with line A—B as the base or 0° line. It will be remembered that eccentric motion of the ends of the shaft causes oscillation of mirror 156 which shifts the ray of light back and forth in a lateral direction at the same time that it is shifted vertically by the rotating mirror so that the ray traces a curve upon the screen. Displacement of the peak of the curve from the zero displacement line E—F indicates the amount of eccentricity of the shaft and this, as previously stated, varies with the amount of unbalance. However, because of the disturbing effect of the sources of error inherent in the machine as previously pointed out, the ratio is not in most cases a direct one so that it has been found best to calibrate the screen to show the amount of unbalance by actual test of shafts having known amounts of unbalance. Unbalance may be indicated in inch ounces or in any other convenient unit. Thus the particular curve illustrated on the chart in Figure 14 indicates an unbalance of 20 inch ounces acting at an angle of 140° from the center line of No. 1 throw.

With the machine properly indexed, the screens calibrated, and the hand lever 22 in its uppermost position in which position the rollers are held out of engagement with the shaft, the workman rests the flanged end of a shaft on the guideways 68, slides the shaft into position above the lifting plunger 70 and depresses the pedal 78 causing the plunger to raise the shaft to convenient height whereupon he connects the coupling 18 to the shaft with the nose 52 of dog 51 occupying the keyway 53 in the shaft. Upon release of the pedal the shaft remains suspended in fixed angular relation to the driving mechanism and with its lower end clear of the top of the guideways 68. The operator now moves lever 22 to its first position. In the course of this movement the brake 200 is applied and released as previously described and upon reaching the first position the rockers 116, 118 and 120 are shifted to a position where the rollers are locked in engagement with the shaft so that it is permitted rotation about its geometrical axis only. The operator now moves the lever to the second position in the course of which clutch 28—30 is engaged so that the shaft is now rotated but with both ends held. Upon movement of the control lever to the third position the bottom rollers remain in holding position but the top rollers are released so that their engagement with the top of the shaft is a yielding one. In this position of the parts unbalance in the shaft causes the upper end of the shaft to perform an eccentric motion which is indicated by the upper indicator I by the ray of light tracing a curve upon the screen 149. The angle and amount of unbalance indicated by the position of the peak of the curve are noted. Let us say that this is an out of balance of 12 inch ounces at 75° indicated on the correction chart shown in Figure 15 by the vector OB'. The operator now moves the lever to the fourth position in which the top of the shaft is held and the bottom yieldingly restrained and takes a similar reading of out of balance at the bottom. Let us say that this reading is of an out of balance of 21 inch ounces at 320° which we have indicated on Figure 15 by vector OA'. If desired the operator may now move the lever to the last position in which both top and bottom are free. In this position readings of out of balance of both top and bottom may be secured but as each reading involves to a larger extent the effect of the out of balance at the opposite end we have preferred for simplicity in calculating to use only the readings where one end is held.

Having secured the desired data the operator now returns the control lever to its initial position whereupon the above described operations are repeated in inverse sequence, the clutch being disengaged during the movement of the lever from the second to the first notch and the brake being applied during the movement of the lever from the first notch to starting position. The brake quickly brings the shaft to a stop and, as in the initial position the rollers are held free of the shaft, it may be readily removed and replaced by another.

Attention is called to the fact that when the shaft is rotated at very slow speeds it will be found that the high side of the eccentric will not coincide with the light side of the shaft. This, as previously stated, we believe to be due to the fact that at these speeds the damping devices exert a drag on the shaft which prevents it from achieving a true rotating balance. We have consequently found it desirable to run the tests at a speed sufficiently high so that the effect of the damping devices is negligible, the high side of the eccentric and the light side of the shaft substantially coinciding. Thus in testing a 1927 Buick Master Six crankshaft, the motor 8, which is preferably of the constant speed type, is so selected as to drive the shaft at approximately 425 R. P. M.

When testing the above shaft in this machine it will be noted that when a given out of balance is located at the bottom of the shaft the reading of out of balance taken at that end will be greater than the reading of out of balance taken at the top of the shaft with the same out of balance applied at that end. This we believe to be due in part to the fact that the lower end of this particular shaft is somewhat heavier than the upper end so that a given out of balance has less effect at the bottom than at the top, and also to the fact that with the upper end of the shaft held the universal joints of the flexible shafting perform a movement of less amplitude and consequently impose less restraint on the movement of the shaft than when the lower end of the shaft is held.

The operator now has data as to two apparent unbalances acting at opposite ends of the shaft. Each reading necessarily includes the effect of all unbalance lying between the locked and free ends of the shaft. If it were possible to remove material from the shaft in the exact planes in which measurements are taken these readings would be sufficiently accurate to guide the workman in removing material. However, it is not practicable to weaken the bearings by removing metal and it is usually desired to remove metal from the end throws of the crankshaft which are often supplied with counterweights. Consequently it is necessary to correct the readings to remove from each the effect of the unbalance at the other end measured as if existing in the throw from which metal is to be removed. This correction is made by an approximate method. Since the indicated readings show the resultant unbalance, this unbalance is resolved into two components, one representing the true unbalance at the end the reading was taken and the other, a correction component, indicating the effect upon the reading of the unbalance at the other end. This latter component should be in a direction parallel to the direction of true unbalance at the last named end and in an amount proportional to the true amount of unbalance at that end. However, since both this direction and amount are unknown it has been necessary to give the correction component a direction and amount based on the indicated unbalance at that end. The amount is determined experimentally. This has been found to give results which are sufficiently accurate for all practical purposes. This will be better understood by reference to Figure 15. In that figure vectors OA' and OB' represent the indicated readings of unbalance at the top and bottom of the shaft, respectively. Thus vector OA' represents an unbalance at the top of the shaft of 21 inch ounces at 320° clockwise from No. 1 crank pin, and vector OB' represents an unbalance at the bottom of the shaft of 12 inch ounces at 75°, from the same reference point on the shaft. Vector OA' is now resolved into two components A'A and OA. Vector A'A is the correction vector and represents the effect of the unbalance at the bottom of the shaft upon the reading of unbalance at the top of the shaft. In strict accuracy it should have a direction parallel to the true direction of out of balance at the bottom of the shaft but this is unknown so that vector A'A is taken in a direction parallel to the known vector OB'. Similarly the ratio of the out of balance represented by vectors A'A to the true amount of out of balance at the bottom of the shaft should be the same as the ratio between the lever arms at which the mass of unbalance at the lower end of the shaft is operating when measured at opposite ends of the shaft. Thus when measured at the top, the resultant out of balance in the bottom throw has a lever arm equal to the distance between the bottom throw and the point where the bottom of the shaft is held. When measured at the bottom the resultant out of balance in the bottom throw has a lever arm equal to the distance between the bottom throw and the point at the top where the shaft is held. While this ratio could be applied to the indicated amount of unbalance at the bottom of the shaft, we have preferred to determine the ratio experimentally and in the case of the shaft above-mentioned have found it to be about 1/6th. Subtracting vector A'A from vector OA' gives the other component OA which represents the true location and amount of unbalance; in this case, indicating to the workman that 20 inch ounces of metal should be removed from the top throw of the shaft at an angle of 330°. In a similar manner vector OB', representing the indicated unbalance at the bottom of the shaft, is resolved into two components, the correction vector BB' representing the effect of the unbalance at the top of the shaft upon the reading at the bottom and the vector OB indicating the true unbalance at the bottom of the shaft, in this case 10 inch ounces at 60°. The workman now removes the specified amounts of metal from the top and bottom throws of the shaft at the indicated angles. If desired, the shaft is again placed in the machine and given a final run to check its balance.

It may be stated that the actual time required to secure readings of unbalance of both top and bottom ends of the shaft is approximately 15 seconds.

While we have endeavored to give in this application the best explanation which we know of the theory upon which this mechanism operates, it is to be understood that this is not offered as an absolute scientific statement of the relation of all of the forces involved in the operation of the device. However, we have given such a full explanation of our method and of the construction and mode of operation of the machine as will enable anyone who employs either to successfully balance crankshafts or other rotating bodies with speed and accuracy; and it is this method and this machine which it is the object of the following claims to protect.

We claim:

1. The method of locating unbalance in rotating bodies which consists in mounting the body so as to permit displacement of the geometrical axis thereof first at one end and then at the other in any direction perpendicular to the axis in response to unbalanced rotating forces in the body, the opposite end of the body being held, rotating the body, measuring the displacement of the body adjacent the free end and correcting the measurement at each end of the body to remove the effect of the resultant unbalance existing in the plane of removal at the other end.

2. The method of locating unbalance in rotating bodies which consists in mounting the body so that first one end and then the other is substantially free to assume a position of rotating balance, the opposite end of the body being held, rotating the body whereby portions of the body rotate after the manner of eccentrics, measuring a characteristic of the eccentric motion performed by said portions in planes other than those in which material may be added or removed, and correcting the measurement of unbalance at each end of the body to remove the effect of the resultant unbalance existing in the plane of removal at the other end.

3. Apparatus for locating unbalance in rotating bodies, comprising means for supporting the body in vertical position so that it is substantially free to assume a position of rotating balance, means for rotating the body, whereupon portions of the body rotate after the manner of eccentrics, and means supported independently of said body for measuring the degree and direction of eccentricity of the motions performed by said portions.

4. The method of locating unbalance in a rotating body which consists in positively holding the body at one point for rotation about its geometrical axis while the remaining portion of the body is substantially free to assume a position of rotating balance, rotating the body whereby in case of unbalance said remaining portion of the body rotates after the manner of an eccentric, and measuring a characteristic of said eccentric motion.

5. The method of locating unbalance in a rotating body which consists in positively holding the body at one point for rotation about its geometrical axis while the remaining portion of the body is substantially free to assume a position of rotating balance, rotating the body whereby in case of unbalance said remaining portion of the body rotates after the manner of an eccentric, and measuring the amount and direction of eccentricity.

6. In the method as defined by claim 5, the point at which the body is held and the point at which the eccentricity is measured lying adjacent the ends of the body.

7. The method of locating unbalance in a rotating body which consists in mounting the body in vertical position, positively centering one end of the body while the other end is free to assume a position of rotating balance, rotating the body and measuring the deviation of the geometrical axis of the body at some point in the free portion thereof with respect to an axis passing through said center.

8. The method of locating unbalance in a rotating body which consists in suspending the body, positively holding the body at one end for rotation about its geometrical axis while the remaining portion of the body is substantially free to assume a position of rotating balance, rotating the body whereby in case of unbalance said remaining portion of the body rotates after the manner of an eccentric, and measuring a characteristic of said eccentric motion.

9. The method of locating unbalance in a rotating body which consists in suspending the body, positively holding the body at one end for rotation about its geometrical axis while the remaining portion of the body is substantially free to assume a position of rotating balance, rotating the body whereby in case of unbalance said remaining portion of the body rotates after the manner of an eccentric, and measuring the direction and amount of eccentricity.

10. In the method as defined in claim 9, the point on said geometrical axis at which the body is confined for rotary movement lying directly below the point of support.

11. The method of locating unbalance in a rotating body which consists in holding the body at one point for rotation about its geometrical axis while the remaining portion of the body is substantially free to assume a position of rotating balance, rotating the body whereby in case of unbalance said remaining portion of the body rotates after the manner of an eccentric, measuring the direction and amount of eccentricity at a point along said axis spaced from said first named point, and repeating the process with the body held at the second named point.

12. In the method as defined by claim 11, said points lying adjacent the respective ends of the body.

13. In the method as defined by claim 11, said operations being performed with the body in suspension.

14. In the method as defined by claim 11, said operations being performed with the body in suspension, the points on said geometrical axis at which the body is successively held for rotation lying directly beneath the point of support.

15. In the method as defined in claim 11, in which measurements are taken in planes other than those in which material is added or removed, the additional step of correcting the measurements of unbalance at each end of the shaft to remove the effect of the resultant unbalance existing in the plane of removal at the other end.

16. The method of locating unbalance in rotating bodies which consists in continuously rotating the body while held first at one point and then at another for rotation about its geometrical axis and with the remainder of the body substantially free to assume a position of rotating balance, and successively measuring the direction and amount of eccentricity of motion of the portion of the body which is free.

17. In the method as defined in claim 16, said measurements being taken at the said points.

18. The method as defined by claim 16, said points lying adjacent the ends of the body.

19. The method as defined in claim 16, the body being suspended during said operations so as to neutralize the effect of gravity.

20. In the method as defined in claim 16, the body being suspended during said operations so as to neutralize the effect of gravity, the points along the axis of the body at which it is successively held lying directly beneath the point of support.

21. The method of locating unbalance which consists in continuously rotating the body while held first at one point and then at another for rotation about its geometrical axis while the remaining portion of the body is permitted substantially unrestrained displacement in response to unbalanced rotating forces existing therein, and successively measuring the characteristics of the displacement of said free portions.

22. In a machine for indicating unbalance, the combination of means for yieldably restraining an end of the body against movement in any direction perpendicular to the axis of the body, means for rotating the body, and means operated by said first named means for indicating the characteristics of the motion performed by the end of the body.

23. In a machine for indicating unbalance, the combination of means adapted to engage the body at one point to hold it for rotation about its geometrical axis, means for rotating the body, means for indicating the character of motion performed by a free portion of the body, and a common control means for said holding means and said rotating means.

24. The combination as defined by claim 23, and a brake for said body, said controlling means being arranged to apply said brake upon disconnection of the rotating means.

25. In a machine for indicating unbalance, the combination of means for holding the body at one point for rotation about its geometrical axis, means for holding the body at another point for rotation about said axis, common control means adapted to alternately bring said holding means into operation, means for rotating the body, and means for indicating a characteristic of the motion performed by the portions of the body which are successively free.

26. In the combination as defined in claim 25, said holding means normally serving to yieldably restrain the shaft.

27. In the combination as defined in claim 25, said holding means normally serving to yieldably restrain the shaft, portions of said holding means serving for the actuation of said indicating means.

28. In a machine for indicating unbalance of the type in which the body to be tested is rotated to observe its condition of balance, the combination of devices for holding the body at one point for rotation about its geometrical axis, devices for holding the body at another point for rotation about said axis, and means for alternately bringing said devices into holding engagement.

29. In the combination as defined in claim 28, each of said holding devices including means for damping the motion of its respective end of the body when released from holding engagement.

30. The combination as defined in claim 28, said holding devices including means for damping the motion of its respective end of the body when released from holding engagement, and indicating mechanism operated by said last named means.

31. In a machine for indicating unbalance of the type in which the body to be tested is rotated to observe its condition of balance, the combination of devices for holding the body at one end for rotation about its geometrical axis, devices for holding the body at its other end for rotation about its geometrical axis, and means for bringing one or the other of said devices into holding engagement or maintaining both of said devices disengaged.

32. In a machine for indicating unbalance of the type in which the body to be tested is rotated to observe its condition of balance, the combination of devices for holding the body at a point adjacent one end of the shaft for rotation about its geometrical axis, devices for indicating a characteristic of the movement performed by the other end of the shaft, devices for holding the body at a point adjacent its other end for rotation about said geometrical axis, devices for indicating a characteristic of the movement performed by the end of the body which is now free, said measuring devices being arranged at points at which the shaft is successively held.

33. In a machine for indicating unbalance, the combination of a plurality of movable guiding devices, means for yieldingly urging said devices into position for engagement with a body to be balanced, and aperiodic damping means for each of said devices.

34. In a machine for indicating unbalance, the combination of a plurality of movable guiding members, means for urging said guide members into position for engagement with a body to be balanced, and means for simultaneously locking said members in engagement with said body.

35. In the combination as defined in claim 34, aperiodic damping means for each of said devices.

36. In the combination as defined in claim 34, said last named means comprising a plurality of interconnected levers carrying stop devices, and means engaging one of said levers for moving all of said levers to locking position.

37. In the combination as defined in claim 34, indicating means operated by one of said guide members.

38. In the combination as defined in claim 34, said guide members comprising levers having rollers for engagement with said body.

39. In a machine for indicating unbalance the combination of means for supporting a body to be balanced so as to permit displacement thereof in case of unbalance in the shaft, means for rotating the body, means for indicating displacement of the body, a brake for stopping rotation of the body, and a common controlling means for controlling rotation of the body and application of the brake.

40. In a balancing machine, the combination of means for suspending the body for rotation to determine unbalance, a support for one end of the body, and elevating means associated with said support having a vertically movable part aligned with the suspending means adapted to raise the body from the support into a position for convenient engagement with the first named means.

41. In the combination as defined in claim 41, said elevating means comprising a plunger and a pedal for operating the plunger.

42. In a machine for indicating unbalance, the combination of means for holding the shaft at one point for rotation about its geometrical axis, means yieldingly engaging the shaft at another point for damping the movement of the remaining portion of the shaft, means for rotating the shaft, and means for measuring the eccentricity of the movement performed by portions of the shaft lying outside of said first named point.

43. In the combination as defined in claim 42, said measurement being taken in the plane in which said damping means is located.

44. In the combination as defined in claim 42, said points being located adjacent the ends of the shaft.

45. In combination with a rotatable body and means for rotating the body, indicating apparatus comprising a screen, light directing means, means operated by displacement of the body or irregularities on the surface thereof for oscillating the light directing means upon rotation of the body, and means receiving the light from said light directing means for simultaneously causing the directed ray to travel in a path at right angles to the plane of oscillation of said light directing means so that the ray will trace a curve on the screen.

46. In the combination as defined in claim 45, said body being connected to the rotating means so that it occupies a predetermined angular relation thereto, and said light ray spreading means comprising a rotatable mirror, and means for rotating the mirror at a speed which bears a fixed ratio to the speed of the body so that during one revolution of the body the ray traverses a fixed length of screen and each point on the line traced by the ray corresponds to a known angular position of the shaft.

47. In combination with a rotatable body and means for rotating the body, indicating apparatus comprising a screen, light directing means, a follower engaging the periphery of the body and adapted to be actuated thereby, means operated by movement of the follower for oscillating the light directing means, and means for simultaneously causing the directed ray to travel in a path at right angles to the plane of oscillation of said light directing means so that the movement of the follower will be indicated by a curve traced on the screen by the ray.

48. The combination of a body, means for rotating the body, and indicating apparatus comprising a rotatable mirror, means for rotating the mirror, means for directing a ray of light upon the mirror, a screen, said mirror being arranged to spread the ray from said light directing means in the form of a line on said screen, means operated as a consequence of rotation of the body for effecting movement of the light directing means to vary the angle which the projected ray makes with the axis of the rotating mirror, the means for driving the body and the means for rotating the mirror being in fixed ratio so that during one revolution of the body the ray of light reflected by the rotating mirror traverses a predetermined length of screen.

49. The combination of a body, means for rotating the body, and indicating apparatus comprising a rotatable mirror, means for rotating the mirror, means for directing a ray of light upon the mirror, a screen, said mirror being arranged to spread the ray from said light directing means in the form of a line on said screen, means operated as a consequence of rotation of the body for effecting movement of the light directing means to vary the angle which the projected ray makes with the axis of the rotating mirror, the means for driving the body and the means for rotating the mirror being in fixed ratio so that during one revolution of the body the ray of light reflected by the rotating mirror traverses a predetermined length of screen, the driving mechanism for said body and mirror operating in synchronism, and said body occupying a fixed angular relation to said driving mechanism whereby the position of the ray of light on said screen will indicate the angular position of the body.

50. In a machine for indicating unbalance in which the body to be balanced is rotated, means for yieldingly engaging the body at spaced points, said means permitting the body to have substantially free movement in radial directions, and means for locking the shaft at one of said points for movement of rotation about its geometrical axis while the other portions are free.

51. A machine for indicating unbalance in which the body to be balanced is rotated, devices for yieldingly engaging the body at points spaced along its axis, said devices permitting the body to have substantially free movement in radial directions, means for locking one of said devices to confine the corresponding portion of the shaft to a movement or rotation.

52. A machine for indicating unbalance in which the body to be balanced is rotated, devices for yieldingly engaging the body at points spaced along its axis, said devices permitting the body to have substantially free movement in radial directions, means for locking one of said devices to confine the corresponding portion of the shaft to a movement of rotation, and means operated by one of said first named means for indicating the character of movement performed by the free portions of the shaft.

53. In a balancing machine the combination of means for mounting the body so as to permit substantially free movement in radial directions, means for rotating the body, operator controlled means engaging one portion of the body to cause said portion to perform a rotary movement only, and means for indicating a characteristic of the motion performed by a free portion of the body.

In testimony whereof we affix our signatures.

CALEB E. SUMMERS.
THOMAS C. VAN DEGRIFT.

CERTIFICATE OF CORRECTION.

Patent No. 1,822,860. Granted September 8, 1931, to

CALEB E. SUMMERS ET AL.

It is hereby certified that error appears in the printed specification of the above numbered patent requiring correction as follows: Page 11, line 117, claim 41, for the numeral "41" read 40; and that the said Letters Patent should be read with this correction therein that the same may conform to the record of the case in the Patent Office.

Signed and sealed this 17th day of November, A. D. 1931.

(Seal)

M. J. Moore,
Acting Commissioner of Patents.